April 24, 1934.  W. K. ROTH  1,955,773
DISPLAY FIXTURE
Filed March 18, 1933   2 Sheets-Sheet 1

WITNESSES
Edw. Thorpe
Albert J. Clark

INVENTOR
William K. Roth
BY
Munn, Anderson, Stanley, Foster & Liddy
ATTORNEY

April 24, 1934.  W. K. ROTH  1,955,773
DISPLAY FIXTURE
Filed March 18, 1933   2 Sheets-Sheet 2
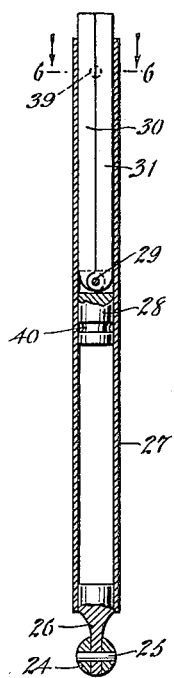
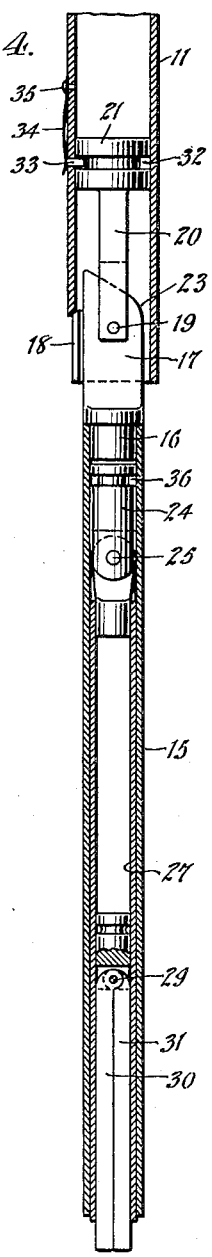
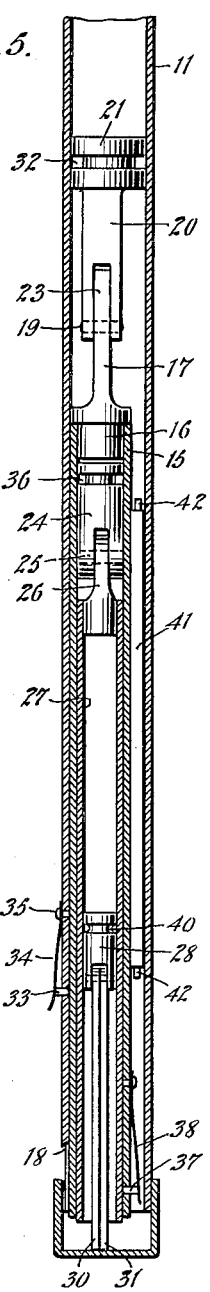
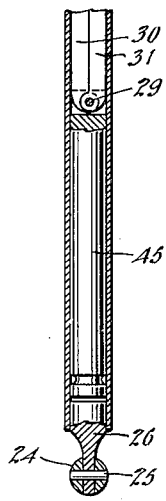
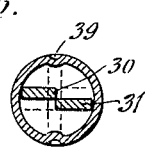
INVENTOR
William K. Roth
BY
ATTORNEY Patented Apr. 24, 1934

1,955,773

UNITED STATES PATENT OFFICE 1,955,773

DISPLAY FIXTURE

William K. Roth, New York, N. Y.

Application March 18, 1933, Serial No. 661,641

6 Claims. (Cl. 211—172)

The present invention relates to display fixtures, and has for an object to provide a fixture with arms extending upwardly from the legs of the stand for supporting articles thereon in an attractive manner adjacent the bottom of the stand.

The invention has in view a stand for a display fixture consisting of a number of tubular supports arranged in a cluster and with legs radially disposed about the stand which may be moved to retracted position within the tubes, and which are provided with upwardly-extending arms for supporting articles of merchandise in an attractive manner about the base of the stand.

Still another object of the invention is the provision of means for holding the legs in position to rigidly support the stand.

The invention also resides in other novel features of construction and arrangements of parts which will be more fully described and claimed hereinafter.

The invention is disclosed in the accompanying drawings, in which

Fig. 3 is a sectional view through one of the arms with the brackets in retracted position within the arm;

Fig. 4 is a sectional view through a portion of one of the tubes forming the stand, with its supporting leg in position to be moved to retracted position therein and showing its arm and brackets in retracted position within the leg;

Fig. 5 is a sectional view through one of the tubes with its supporting leg, arm, and brackets in retracted position within the tube;

Fig. 6 is a cross-sectional view on the line 6—6 of Fig. 3;

Fig. 7 is a plan view of one of the bars for holding the legs in spaced relation;

Fig. 8 is a similar view to Fig. 3, of a modified form of the plunger for the brackets, which permits the brackets to be extended a greater distance above the arm.

Figure 1:
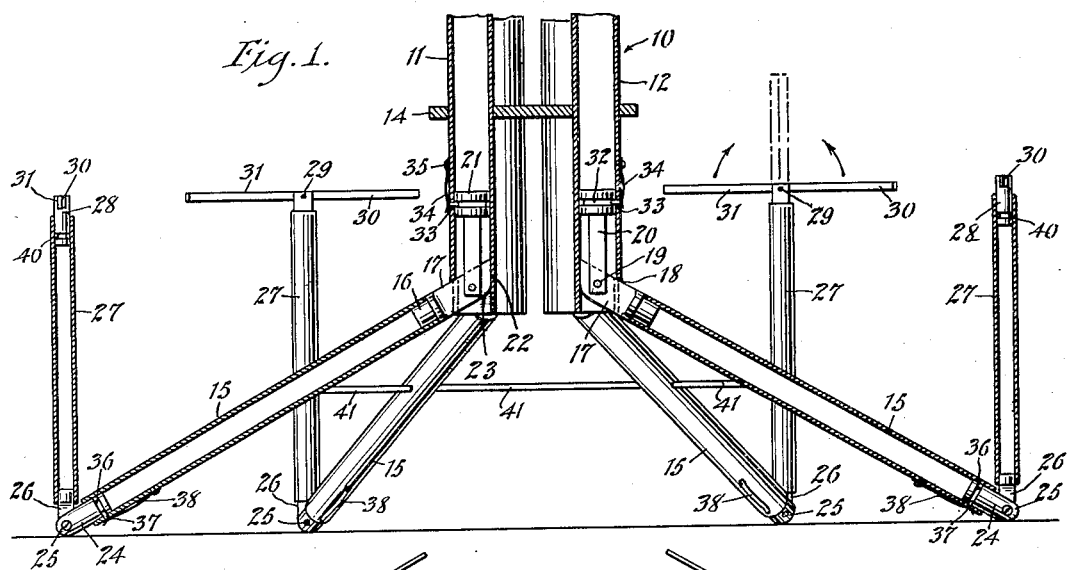
Figure 1 is a sectional view of the lower portion of a display stand embodying the invention.

The display device 10 illustrated in the drawings, includes a stand 11 composed of a plurality of tubes 12, mounted in openings 13 in a plate 14. The tubes 12 may be of any desired length, the upper ends thereof being constructed in any desired manner to constitute a support for articles for display. Each of the tubes 12 is provided with a tubular leg 15 extending outwardly therefrom and in which is secured a plug 16 having a shank 17 which extends into the lower end of its tube 12 through a vertical slot 18. The shanks 17 are each pivoted at 19 to a depending bar 20, which bars are connected at their upper ends to plungers 21, slidable in the tubes 12 respectively, to permit retraction of the legs to inoperative positions therein. The inner ends of the shanks 17 are disposed against the inside wall of the tubes 12, as at 22. This end of each of the shanks is cut to fit against the said inner wall, and has its bottom edge rounded, as at 23, to allow the legs 15 to be readily moved to retracted position within the tubes 12.

The outer end of each of the tubular legs 15 is provided with a plug 24 movable within the leg and to which is pivoted, at 25, a plug 26 secured in the lower end of an upwardly-disposed arm 27. These arms each carry a plug 28 similar to the plug 24, to which are pivoted, at 29, brackets 30 and 31 on which articles may be hung for displaying the same about the base of the stand 11.

The plungers 21 in the tubes 12 are each provided with an annular groove 32, which is normally engaged by a pin 33 carried by a spring 34, which is riveted at its upper end, at 35, to its tube 12. This construction holds the plungers 21 in operative position in the lower ends of the tubes. When the spring 34 is sprung away from its tube, the plunger 21 may be moved upwardly within the tube. The plugs 24 are each provided with a recess 36, which is normally engaged by a pin 37 carried by a spring 38 similar to the spring 34. The tubular arms 27 are indented, as at 39, to engage an annular recess 40 in the plug 28 for holding the plug in position in the arm.

When the stand is to be collapsed, the brackets 30 and 31 are each swung upwardly to the dot-and-dash line position shown in Fig. 1, and the brackets together with their respective plugs 28 moved to retracted position within the arms 27, as shown in Fig. 3, it being understood that the plugs 28 may be forced past the indentations 39. The plugs 24 are then moved to retracted position within the legs 15 together with the arms 27, as shown in Fig. 4, the plungers 21 then being released from engagement with the springs 34, and the legs 15 together with the arms 27 and the brackets 30 and 31 moved to retracted position within their respective tubes 12.

Figure 2:
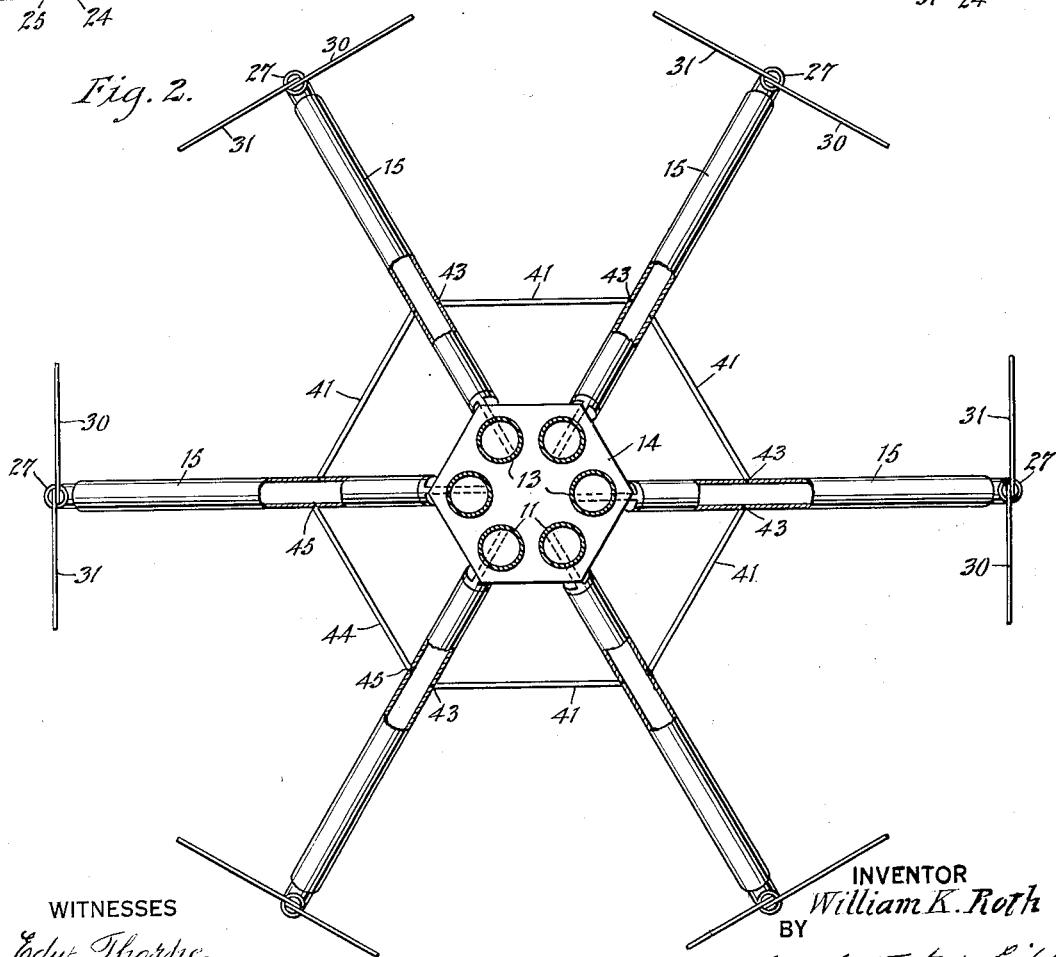
Figure 2 is a top plan view of the construction shown in Fig. 1.

The legs 15 are held in spaced radial relation by means of five bars 41, having pins 42 arranged in their ends which fit into openings 43 in the legs 15, and a key bar 44 having pointed ends which are adapted to be snapped into openings 45 in two adjacent legs, as shown in Fig. 2. It is to be understood that the legs 15 connected together in this manner rigidly support the stand 11, the plugs 24 positioned in the outer ends of the legs resting on the floor or other support for the stand, and the arms 27 pivoted to the plugs 24 in the manner hereinbefore described, serving to support the brackets 30 and 31 in an attractive manner about the base of the stand 11. It is understood that the bars 41 and 44 will be detached when the stand is to be collapsed.

It is to be understood that the pivots 25 are screw rods which may be tightened in order that the arms 27 may be disposed upwardly in various angular arrangements. Instead of the plugs 28, the arms 27 may be provided with relatively longer plunger rods 45 by which the brackets 30 and 31 may be arranged at a relatively higher elevation.

What is claimed is:

1. In a display fixture, a stand consisting of an assemblage of tubes in fixed relation to each other, said tubes each having a leg pivotally connected therewith and being formed with a slot in the lower end thereof through which the leg extends, the inner ends of said legs being engaged with the inside faces of the tubes respectively, when the outer ends of the legs are in contact with a suitable rest, to support the assemblage in upright position.

2. In a display fixture, a stand composed of a number of tubes assembled in fixed relation to each other, said tubes each having a leg pivotally connected therewith and being formed with a slot in the lower end thereof through which the leg extends, a plunger in the lower end of each of said tubes to which the legs are pivoted, the inner ends of said legs being engaged with the inside faces of the tubes respectively, when the outer ends of the legs are in contact with a suitable rest to support the tubes in upright positions, said plungers being slidable in the tubes respectively and said legs being swingable on their pivotal connections with the said plungers to positions out of engagement with the said slots for moving the legs with the plungers to retracted positions within the tubes respectively.

3. In a display fixture, a stand composed of a plurality of tubes assembled in fixed relation to each other, said tubes each having a tubular leg pivotally connected therewith, the inner end of each leg being provided with a shank extending into the lower ends of the tubes respectively, said tubes each having a slot in the lower end thereof in which the said shanks are disposed, the inner ends of said legs being engaged with the inside faces of the tubes respectively, when the outer ends of the legs are in contact with a suitable rest to support the tubes in upright positions, an arm pivotally connected to the lower end of each of said tubular legs of a size to be movable to retracted position therein, brackets on which articles may be hung carried by the upper end of each of said arms, said brackets being movable with the said arms to retracted positions within the tubular legs respectively, and a plunger in each of the tubes to which the tubular legs are pivoted, said plungers being slidable within the said tubes, and said tubular legs being movable to positions out of engagement with the said slots and slidable with the plungers to retracted positions within the tubes respectively.

4. In a display fixture, a stand composed of a number of tubes assembled in fixed relation to each other, said tubes each having a leg pivotally connected therewith and being formed with a slot in the lower end thereof through which the leg extends, the inner ends of said legs being engaged with the inside faces of the tubes respectively, when the outer ends of the legs are in contact with a suitable rest, to support the said tubes in upright positions, and a plunger in the lower end of each of said tubes respectively to which the legs are pivoted, said plungers being slidable in the tubes and said legs being swingable on their pivotal connections with the plungers to positions out of engagement with the slots for moving the legs with the plungers to retracted positions within the tubes respectively.

5. In a display fixture, a stand composed of a number of tubes assembled in fixed relation to each other, a support for said stand composed of radially arranged legs pivotally and slidably connected with the tubes respectively, said tubes each having a slot in the lower end thereof in which the legs are positioned to support the stand, said legs being slidable within the tubes respectively and movable on their pivotal connections therewith out of engagement with the said slots to retracted positions within the tubes respectively.

6. In a display fixture, an assembly of tubes in fixed relation with respect to each other, slides in said tubes respectively, means to releasably hold each of said slides in place, each of said tubes having a slot opening through the lower end thereof, legs pivotally connected with said slides respectively, the pivot of each leg being disposed so that the inner end of the leg may be disposed in the related slot, and also in contact with the inside of the related tube, the construction and arrangement being such that the legs may be disposed laterally downward with respect to the assembly, with their outer ends in contact with a suitable rest, to support the assembly upright, said legs being movable to retracted positions within the tubes respectively upon the release of said slides.

WILLIAM K. ROTH.